(12) United States Patent
Hoggarth et al.

(10) Patent No.: US 10,606,363 B2
(45) Date of Patent: Mar. 31, 2020

(54) VEHICLE DISPLAY SYSTEM AND METHOD

(71) Applicant: Ford Global Technologies, LLC, Dearborn, MI (US)

(72) Inventors: Marcus Hoggarth, Hertfordshire (GB); Tom Gordon, London (GB); Alan Pich, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/995,487

(22) Filed: Jun. 1, 2018

(65) Prior Publication Data

US 2018/0356897 A1 Dec. 13, 2018

(30) Foreign Application Priority Data

Jun. 9, 2017 (GB) .................................. 1709255.2

(51) Int. Cl.
*G06F 3/01* (2006.01)
*B60N 2/02* (2006.01)
*B60K 35/00* (2006.01)
*G06F 3/042* (2006.01)
*H04N 9/31* (2006.01)
*B62D 47/00* (2006.01)
*B60R 11/02* (2006.01)

(52) U.S. Cl.
CPC .............. *G06F 3/017* (2013.01); *B60K 35/00* (2013.01); *B60N 2/02* (2013.01); *B62D 47/003* (2013.01); *G06F 3/0425* (2013.01); *H04N 9/3185* (2013.01); *H04N 9/3194* (2013.01); *B60K 2370/152* (2019.05); *B60K 2370/736* (2019.05); *B60K 2370/739* (2019.05); *B60R 11/0229* (2013.01); *B60R 2011/0282* (2013.01); *G06F 2200/1614* (2013.01); *H04N 9/3141* (2013.01)

(58) Field of Classification Search
CPC ..... G06F 3/017; G06F 3/0425; H04N 9/3194; H04N 9/3185; B62D 47/003; B60N 2/02; B60K 35/00
See application file for complete search history.

(56) References Cited

U.S. PATENT DOCUMENTS 6,460,922 B1 * 10/2002 Demick ............... B60N 2/3034
296/65.11
2005/0222719 A1 10/2005 Fukuro
(Continued)

FOREIGN PATENT DOCUMENTS

EP 1323571 A2 7/2003
EP 1352784 A2 * 10/2003 ............. B60K 35/00
EP 1352784 A2 10/2003

*Primary Examiner* — Yi Wang
(74) *Attorney, Agent, or Firm* — David Coppiellie; Price Heneveld LLP

(57) ABSTRACT

A method for a display system of a motor vehicle is provided. The motor vehicle comprises one or more seats for occupants of the vehicle, the position and/or orientation of the seats within an interior of the motor vehicle being variable. The method comprises: determining a position and/or orientation of the seats; determining an orientation at least a first portion of an image to be displayed by the display system according to the position and/or orientation of the seats; and displaying the image such that at least the first portion of the image is in the determined orientation. A display system for a motor vehicle is also provided.

14 Claims, 3 Drawing Sheets

(56) References Cited

U.S. PATENT DOCUMENTS

| | | | |
|---|---|---|---|
| 2007/0095122 A1* | 5/2007 | Voeller | G01D 7/02 |
| | | | 73/1.08 |
| 2013/0083072 A1 | 4/2013 | Yoshino | |
| 2015/0254809 A1 | 9/2015 | Shibata et al. | |
| 2018/0014182 A1* | 1/2018 | Jaegal | B60K 35/00 |
| 2018/0052494 A1* | 2/2018 | Coburn | G06F 1/1675 |
| 2018/0194247 A1* | 7/2018 | Kim | B60N 2/0244 |

* cited by examiner

VEHICLE DISPLAY SYSTEM AND METHOD

FIELD OF THE INVENTION

The present invention generally relates to a display system for a motor vehicle, and more particularly relates to a display system configured to improve visibility of the display screen for occupants of the motor vehicle.

BACKGROUND OF THE INVENTION

A vehicle, such as a motor vehicle, may have a plurality of seats that are capable of being arranged into a number of seating configurations. For example, the seats may be arranged into a "travelling" arrangement, in which the seats are arranged in one or more rows, each facing the direction of travel. Alternatively, the seats may be arranged in a "conferencing" arrangement in which two or more of the seats are arranged to face one another. In the conferencing arrangement, the seats may be arranged in rows, or may be spaced apart around the vehicle interior.

Vehicles often comprise a display screen configured to provide information or entertainment to occupants of the vehicle. When the arrangement of the vehicle seats changes, the relative arrangements of one or more of the seats and the display screen may make it difficult for occupants seated in the seats to view the display screen.

SUMMARY OF THE INVENTION

According to an aspect of the present disclosure, there is provided a method for a display system of a motor vehicle, wherein the motor vehicle comprises one or more seats for occupants of the vehicle, the seating configurations, such as the position and/or orientation of the seats, within an interior of the motor vehicle being variable, wherein the method comprises determining a position and/or orientation of the seats, determining an orientation at least a first portion of an image to be displayed by the display system according to the position and/or orientation of the seats and displaying the image such that at least the first portion of the image is in the determined orientation.

The position and orientation of a display screen or surface of the display system on which the image is displayed, may be fixed relative to the vehicle. The display screen or surface may be substantially horizontal.

The method may further comprise determining an occupancy of the seats, such as whether or not each of the seats is occupied. The orientation of at least the first portion of the image may be at least partially determined according to the occupancy of the seats. For example, the position and/or orientation of any unoccupied seats may not be considered when determining the orientation of at least the first portion of the image to be displayed by the display system.

The method may further comprise determining an operating mode of the vehicle. The orientation of at least the first portion of the image may be at least partially determined according to the operating mode of the vehicle. The operating mode may be one of a manual driving mode, a semi-autonomous mode and an autonomous mode. If the operating mode is a manual or semi-autonomous driving mode, the orientation of at least the first portion of the image may be determined such that at least the first portion of the image is oriented away from a driver of the vehicle, e.g., towards the other occupied seats of the vehicle. The driver's seat may be treated in the same way as an unoccupied seat for the purpose of determining the orientation of the image to be displayed if the driving mode is the manual or semi-autonomous driving mode, e.g., the position and/or orientation of the driver's seat may not be considered when determining the orientation of the first portion of the image to be displayed.

The method may further comprise determining an orientation of the motor vehicle, e.g., the compass direction in which the vehicle is pointing. The orientation of the first portion and/or a second portion of the image relative to the vehicle may be determined according to the orientation of the motor vehicle. For example, the first and/or second portion of the image may have a fixed orientation relative to an external frame of reference that does not move with the vehicle. Alternatively, the orientations of the either or both of the first and second portions of the image may remain stationary relative to the vehicle as the orientation of the vehicle changes.

The image may comprise a third portion. An orientation of the third portion of the image may remain stationary relative to the vehicle as the orientation of the vehicle changes. The orientation of at least one of the first, second and third portions of the image may remain stationary relative to the vehicle, such as a frame of the vehicle, as the position and/or orientation of the seats change.

The orientation of at least the first portion of the image to be displayed by the display system may be selected from a set of predetermined orientations. Each of the set of predetermined orientations may correspond to a configuration, e.g., positions and/or orientations, of the seats of the motor vehicle and/or an occupancy of the seats of the motor vehicle. The set of predetermined orientations may comprise a predetermined orientation corresponding to each possible configurations and occupancies of the seats.

Alternatively, the orientation of at least the first portion of the image to be displayed by the display screen may be calculated according to the position and/or orientation of each of the seats. For example, the orientation of at least the first portion of the image may be calculated in order to minimize a maximum or average viewing angle of occupants of the seats. Only the positions and/or orientations of occupied seats may be considered when calculating the orientation of at least the first portion of the image.

According to another aspect of the present disclosure, there is provided a display system for a motor vehicle, wherein the motor vehicle comprises one or more seats for occupants of the vehicle, the position and/or orientation of the seats within an interior of the motor vehicle being variable, wherein the display system comprises a display device configured to display an image and a controller configured to receive a signal indicating the position and/or orientation of the seats; determine an orientation of at least a first portion of the image to be displayed by the display device according to the position and/or orientation of the seats; and display the image with the display device, such that at least the first portion of the image is in the determined orientation.

The system may further comprise one or more seat sensors configured to determine the position and/or orientation of the seats and provide the signal to the controller.

The controller may be configured to receive an occupancy signal indicating the occupancy of the seats. The orientation of at least the first portion of the image to be displayed by the display system may be determined according to the occupancy of the seats. For example, only the position and/or orientation of the occupied seats may be considered when determining the orientation of at least the first portion of the image.

The system may further comprise one or more seat occupancy sensors configured to determine whether the seats are occupied and provide the occupancy signal to the controller. The occupancy sensors may be provided on the seats. For example, the occupancy sensors may comprise pressure sensors provided in the seat. The occupancy signal may be a pressure measurement signal. The controller may determine the occupancy of the seats based on the pressure measurements. Additionally or alternatively, the occupancy sensor may comprises a camera configured to capture an image of occupants seated in the seats.

The controller may be configured to receive a signal indicating an orientation of the vehicle, e.g., a compass direction in which the vehicle is pointing. The orientation of the first and/or a second portion of the image may be determined according to the orientation of the vehicle. The system may comprise the vehicle orientation sensor. The system may be configured such that an orientation of a third portion of the image remains stationary relative to the vehicle as the orientation of the vehicle changes. The orientation of the third portion of the image may be independent of the positions and/or orientations of the seats.

The position and orientation of the display device may be fixed relative to the vehicle. The display system may be configured such that the image is displayed on a surface of a table or other interior trim portion within the interior of the motor vehicle. The display device may comprise a projector configured to project the image onto the surface of the table or other trim portion.

The table or other trim portion may comprise a touch sensitive element configured to permit an occupant of the vehicle to interact with the image. The touch sensitive element may be embedded within the surface of the table or other trim portion of the vehicle.

The system may further comprise a memory associated with the controller. The memory may be configured to store one or more predetermined image orientations associated with one or more predetermined seating configurations of the vehicle seats.

According to a further aspect of the present disclosure, a display system for a vehicle having a variable seating configuration is provided. The display system includes a display device and a controller configured to receive a signal indicating a seating configuration, determine an orientation of an image to be displayed by the display device according to the seating configuration and display the image with the display device, such that the image is in the determined orientation.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
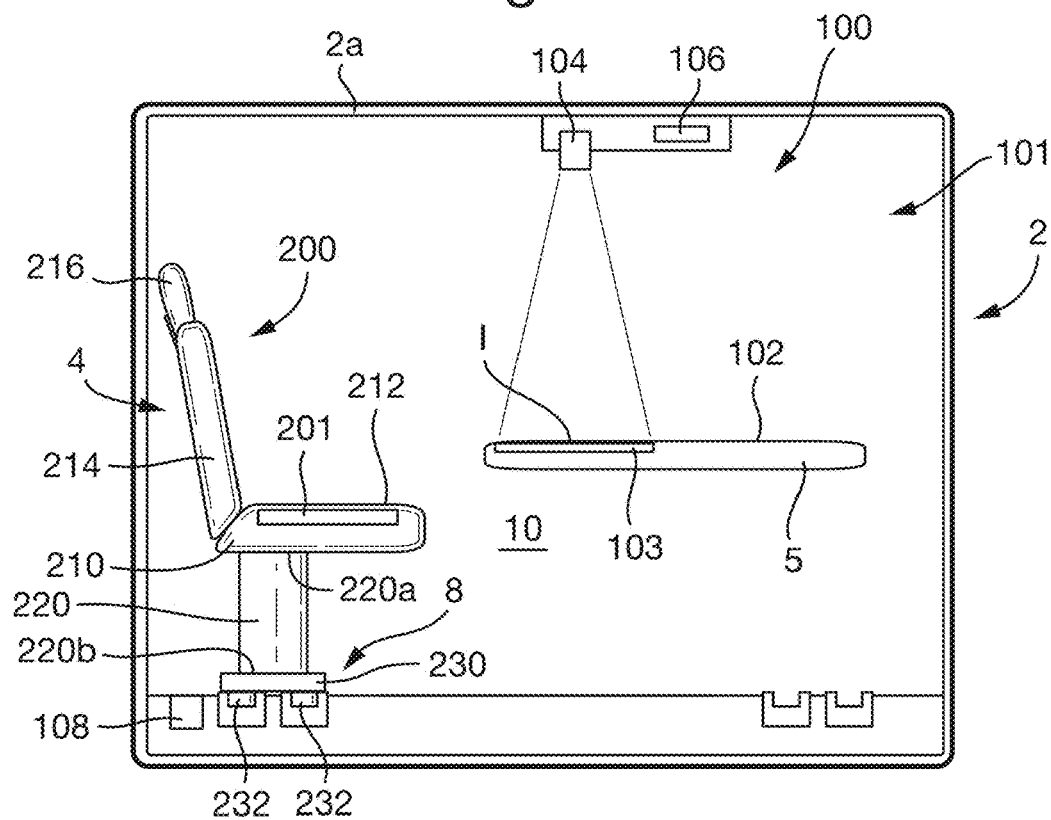
FIG. 1 is a schematic sectional view of a motor vehicle according to arrangements of the present disclosure.

With reference to FIG. 1, a motor vehicle 2 comprises a seating system 4 and a display system 100. The display system 100 comprises a display device 101 configured to display an image I, and a controller 106 configured to control the operation of the display device.

In the arrangement shown in FIG. 1, the display device 101 comprises a display surface 102 and a projector 104 configured to project the image I onto the display surface 102. The display surface 102 is provided on a table 5 arranged within an interior space 10 of the vehicle 2. The projector 104 is arranged above the display surface 102 and coupled to a roof 2a of the vehicle. However, in other arrangements of the disclosure, the display surface 102 may be provided on any other trim portion or interior surface of the vehicle and the projector 104 may be located in any suitable position from which it can project the image I onto the display surface 102.

Furthermore, although in the arrangement shown in FIG. 1, the image I is formed on the display surface 102 by projecting the image I using the projector 104, in other arrangements, the image I may be formed on the display surface 102 using another method. For example, the display surface 102 may be provided with a plurality of display elements, such as light emitting diodes or liquid crystal display elements, configured to form pixels of the image I to be displayed by the display system 100. The image I may thereby be displayed directly on the display surface 102. In such arrangements, the projector 104 may be omitted and the controller 106 may control the operation of the display elements.

The controller 106 may be configured to generate the image I to be displayed by the display system 100. Furthermore, the controller 106 may be configured to determine orientations of the one or more portions of the image I to be displayed by the display system on the display surface 102, as described below. In particular, the orientation of the or portions of the image may be determined in order to improve the visibility of the image I to occupants seated within the vehicle 2 and/or in order to communicate information to the vehicle occupants by virtue of the relative orientations of the portions of the image.

The display surface 102 further comprises a touch sensitive element 103 provided on or adjacent to the display surface 102 and configured to detect when a user of the display system is touching the display surface 102 at a particular location. The touch sensitive element 103 may provide signals to the controller 106 indicating that the display surface 102 has been touched by the user. The signals may indicate the location or locations on the display surface where the display surface 102 was touched. In this way a user may interact with the image I provided by the display system 100. When the display surface 102 is provided on a trim portion of the vehicle 2, such as the table 5, the touch sensitive element 103 may be embedded within the trim portion.

The seating system 4 comprises a guide track assembly 8 and a plurality of seats 200. The seats 200 are movably supported by the guide track assembly 8, such that the seats 200 are movable within the vehicle. In particular, the seats may be movable between predetermined seating positions 7, described below with reference to FIGS. 2A-2D.

As depicted in FIG. 1, each of the seats 200 comprises a seat body 210 having a base 212, a back rest 214 and a head rest 216. The seat body 210 is supported by a seat pillar 220. The seat pillar 220 extends in a substantially vertical direction from a first end 220*a* of the seat pillar to a second end 220*b*. The first end 220*a* of the seat pillar is coupled to the seat body 210, e.g., to the base 212, and the second end 220*b* is coupled to a boss 230 of the seat 200.

In the arrangement shown in FIG. 1, the seat pillar 220 is a tubular support member having an obround cross-section. However, in other arrangements, the cross-section of the seat pillar 220 may be circular, oval, square, rectangular or any other desirable shape. Alternatively, the seat pillar 220 may be a solid beam, such as an I-beam or any other desirable structure or framework. When the seat pillar 220 comprises a solid beam, such as an I-beam, or an alternative structure or framework, the seat pillar may comprise a tubular trim portion surrounding the solid beam, structure or framework.

The seat 200 further comprises one or more follower assemblies 232 coupled to the boss 230. The follower assemblies 232 are configured to engage the guide track assembly 8 in order to guide the movement of the seat 200 between seating positions. Additionally, the follower assemblies 232 and/or the boss 230 may be configured to support the seat 200 within the vehicle, to transfer any loads from the seat, such as the weight of a passenger sat in the seat, to a frame of the vehicle (not shown).

The seat body 210 may be movably, e.g., pivotally, coupled to the first end 220*a* of the seat pillar 220. The seat body 210 may therefore be able to pivot relative to the boss 230 to adjust the orientation of the seat within the vehicle. For example, the seat body 210 can be turned to face in the direction of travel of the vehicle 2 or to face into the interior space 10, e.g., towards the table 5.

In other arrangements, it is also envisaged that the seat pillar 220 may be pivotally coupled to the boss 230, such that the seat pillar 220 and the seat body 210 can be rotated relative to the guide track assembly 8 in order to adjust the orientation of the seats 200.

With reference to FIGS. 2A, 2B, 2C and 2D, in some arrangements of the present disclosure, the seating system 4 comprises one or more seats 6, such as a first seat 6*a*, a second seat 6*b* and a third seat 6*c*. The seats 6 are similar to the seat 200 described in relation to FIG. 1 above. The features of the seat 200 described with reference to FIG. 1 may apply equally to the seats 6. In the arrangement shown in FIGS. 2A-2D, the seats 6 are movably supported by the guide track assembly 8, such that the seats are movable between predetermined seating positions 7*a*, 7*b*, 7*c*, 7*d*, 7*e*, 7*f* defined within the vehicle.

In the arrangement shown in FIGS. 2A-2D, the seating system 4 comprises three seats, 6*a*, 6*b*, 6*c* movable between six seating positions 7*a*-7*f*. However in other arrangements, the seating system 4 may comprise one, two, four, or more than four seats, which may be movable between two, three or more than three seating positions. In some arrangements, particular, e.g., discrete, seating positions may not be defined by the seating system, and the seats may be movable to any desired position along the guide track assembly 8.

As depicted in FIGS. 2A-2D, the guide track assembly 8 comprises a first guide track 8*a* and a second guide track 8*b*. The second guide track 8*b* is arranged to the side of, e.g., radially inside of, the first guide track 8*a*. The first and second guide tracks 8*a*, 8*b* extend at least partially around the interior space 10 within the vehicle 2. The guide track assembly 8 therefore extends around the display surface 102 of the display system 100.

Figure 2A:
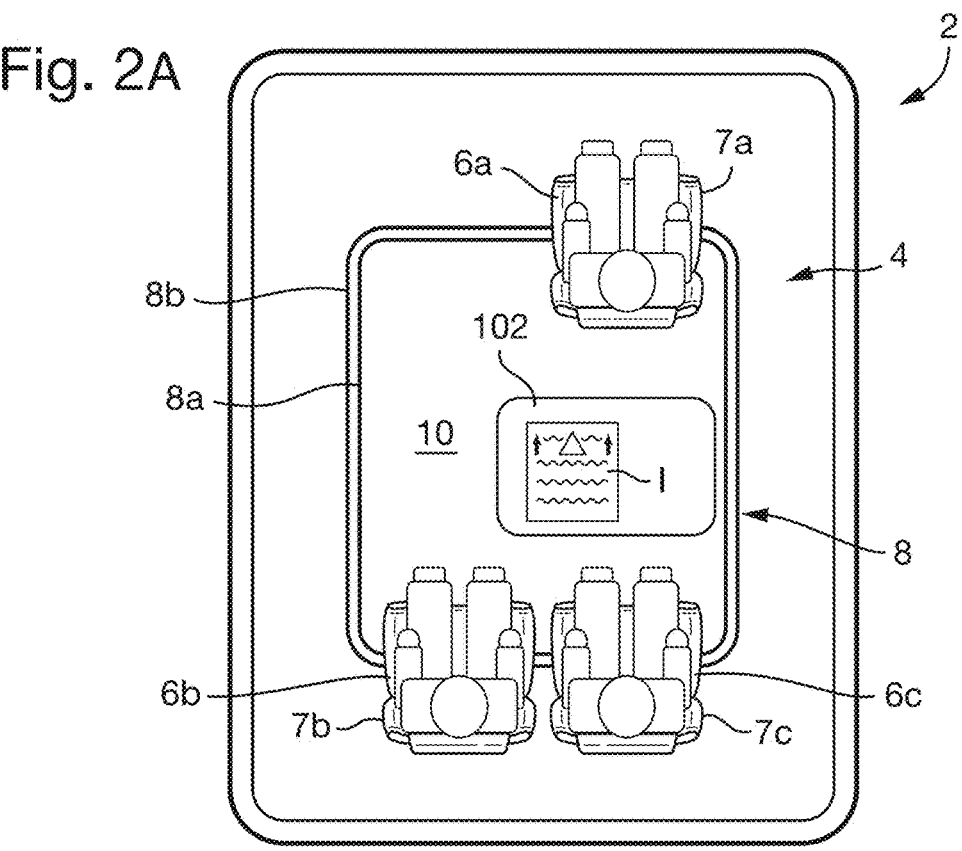
FIG. 2A is a schematic view of a seating arrangement of occupants within the motor vehicle in a first seating configuration.
Figure 2B:
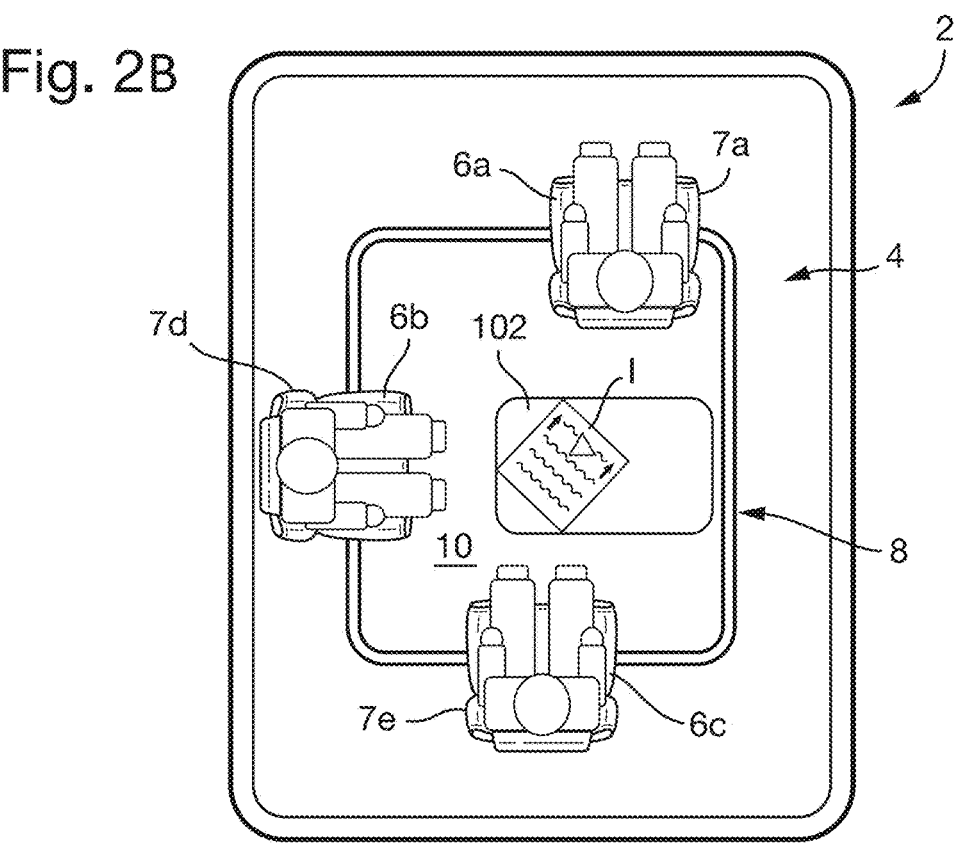
FIG. 2B is a schematic view of a seating arrangement of occupants within the motor vehicle in a second seating configuration.
Figure 2C:
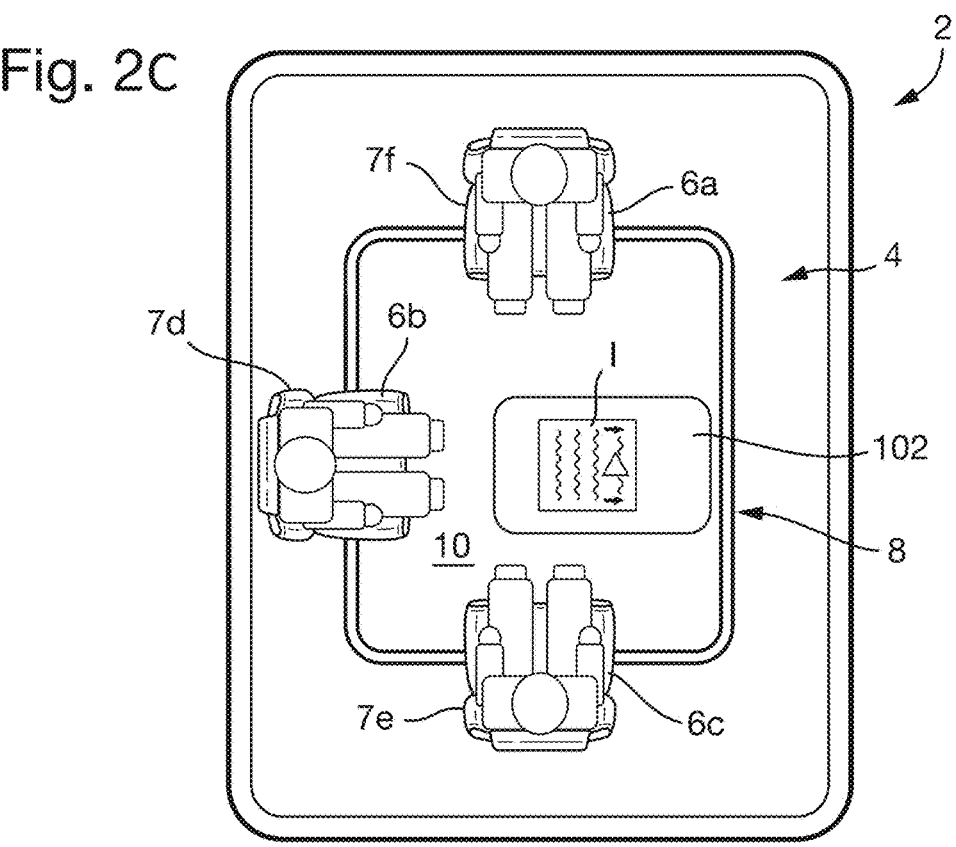
FIG. 2C is a schematic view of a seating arrangement of occupants within the motor vehicle in a third seating configuration.

FIGS. 2A, 2B and 2C depict three pre-defined seating configurations of the seating system 4. The seating configuration shown in FIG. 2A may be referred to as a standard manual driving configuration. In the standard manual driving configuration, each of the seats is pointing in the predominant direction of travel of the vehicle. The first seat 6*a* of the vehicle is positioned towards the front of the vehicle in a driving position 7*a*. The second and third seats 6*b*, 6*c* are arranged in a row, e.g., side by side, behind the first seat 6*a*. The second and third seats 6*b*, 6*c* are provided on the opposite side of the display screen 102 to the first seat 6*a*.

The seats, e.g., the second and third seats 6*b*, 6*c*, may be moved from the configuration shown in FIG. 2A in order to arrange the seats in the configuration shown in FIG. 2B. The seating configuration shown in FIG. 2B may be referred to as a passenger conferencing configuration. In this configuration, the second and third seats 6*a*, 6*b* are arranged to facilitate conferencing between passengers and/or collaborative activities being performed by the passengers. This configuration may typically be used when the vehicle is operating in a manual or semi-autonomous configuration in which input is required by a driver to operate the vehicle. The first seat 6*a* therefore remains in the same position as in the arrangement shown in FIG. 2A, e.g., the driving position 7*a*, and remains facing forwards to provide the driver with a good view of the road ahead.

The vehicle 2 may be an autonomous vehicle capable of operating without input from the driver. When the vehicle 2 is operating in an autonomous operating mode, the first seat 6*a*, or another seat that is presently positioned in the driving position 7*a*, may be arranged together with the other seats into the configuration shown in FIG. 2C. In this configuration, the first seat 6*a* is turned to face in a rearwards direction of the vehicle, e.g., into the interior space 10. In this configuration each of the seats is arranged to face into the interior space 10. This configuration may therefore facilitate group conversations and collaborative activities between each of the occupants of the vehicle. Furthermore, in this configuration, each of the seats is facing the display surface 102. The seating configuration shown in FIG. 2C may also be used when the vehicle is stationary and is not being driven by one of the occupants. The seating configuration shown in FIG. 2C may therefore also be used in vehicles that do not have an autonomous driving capability.

In the arrangement depicted in FIGS. 2A-2D, the seating system 4 is configured such that the positions of the seats are manually adjustable by a user pushing or pulling the seats along the guide track assembly 8 into desired positions. However, in alternative arrangements, the seating system may comprise one or more actuators (not shown) configured to move the seats 6 along the guide track assembly 8. The actuators may be coupled to the guide track assembly 8 or a frame of the vehicle 2. Alternatively, the actuators may be provided on each of the seats. The seating system may comprise a seating system controller (not shown) configured to control the operation of the actuators in order to move the seats 6 between the predetermined seating configurations, such as those depicted in FIGS. 2A, 2B and 2C. Although the seating system has been described in relation to the guide track assembly 8, it is envisaged that the present disclosure may apply to other seating systems enabling the seats to translate and/or rotate.

The seating configuration may be determined by the position of the seats 6 and the orientation of the seats, according to one embodiment. As shown in FIGS. 2A-2D, as the positions and/or orientations of the seats 6 change as the seating system 4 changes between seating configurations, such as those depicted in FIGS. 2A, 2B and 2C, it may be desirable for the orientation of the image I or a portion of the image displayed by the display system 100 to be adjusted in order to provide improved viewing angles of the image I for one or more occupants of the vehicle. For example, in FIG. FIG. 2A, the first seat 6a is in a driving position facing forwards in the direction of travel, and the second and third seats are arranged behind the first seat at the rear of the vehicle interior 10, in a row across the vehicle, both facing forwards. When the seats are arranged in this way, the display system 100 displays the image I such that a vertical axis of the image is aligned with a longitudinal direction of the vehicle such that it can be easily viewed by occupants in the second and third seats.

In the arrangement shown in FIG. 2B, the first seat 6a remains in the driving position and the third seat remains at the rear of the vehicle interior 10 facing forwards, however, the second seat 6b has moved around the guide track to one side of the vehicle interior 10 and has been turned by 90° to face laterally into the vehicle interior 10 to face the display surface 102. In this arrangement, the display system 100 adjusts the orientation of the image, such that the vertical axis of the image is angled at 45° to the longitudinal axis of the vehicle. In this way, occupants in both the second and third seats are able to view the image I equally well.

In the arrangement shown in FIG. 2C, the first seat 6a has been turned to face rearwards into the interior 10 of the vehicle towards the display surface. The second and third seats 6b, 6c remain in the same positions as in the arrangements shown in FIGS. 2A-2D. In this arrangement, the display system 100 adjusts the orientation of the image, such that the vertical axis of the image is aligned with a lateral axis of the vehicle in order to minimize the maximum viewing angle experienced by any of the occupants.

Figure 3:
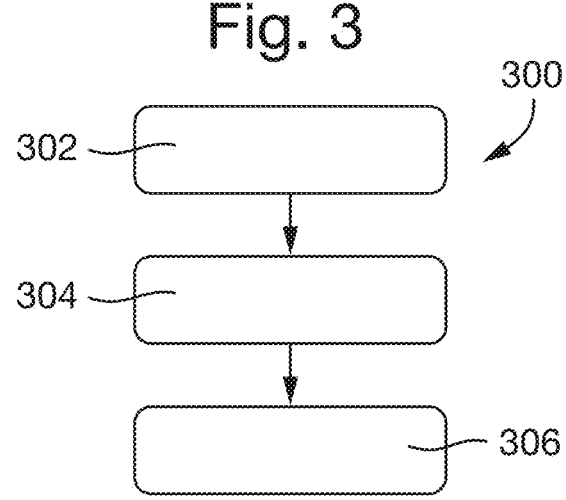
FIG. 3 is a flow chart illustrating a method for a display system of the motor vehicle according to arrangements of the present disclosure.

With reference to FIG. 3, the controller 106 may be configured to control the operation of the display system 100 using a method 300, according to arrangements of the present disclosure. The method 300 comprises a first step 302, in which a position and/or orientation of each of the seats within the vehicle is determined.

With reference to FIG. 1, the display system 100 may comprise one or more seat position sensors 108 configured to determine the positions and/or orientations of each of the seats within the vehicle. The seat position sensors 108 may be configured to provide seat position signals to the controller 106 indicating the positions and/or orientations of the seats 6 to be used within the method 300.

In alternative arrangements, the seat position sensors 108 may be provided within the seating system 4. For example, the seat positions sensors may be provided on each of the seats 6. Alternatively, the seating system controller mentioned above may be configured to determine the positions of each of the seats based on how the seats have been moved by the actuators between the seating configurations and may provide seat position and/or orientation information to the controller 106. In this case the seat position sensors 108 may not be provided.

Returning to FIG. 3, in a second step 304 of the method, an orientation of at least a first portion of the image I to be displayed by the display system 100 is determined at least partially according to the position and/or orientation of the seats. In particular, the orientation of the first portion of the image I may be determined in order to minimize the viewing angles of each of the occupants of the vehicle, e.g., angles between a forward direction of the seat in which the occupant is sitting, and a vertical direction of the image I. For example, the orientation of the first portion of the image I may be determined in order to minimize the maximum viewing angle of any one of the occupants. Alternatively, the orientation of the first portion of the image I may be determined in order to minimize an average viewing angle of all of the occupants.

If the seating system 4 defines a plurality of predetermined seating configurations, such as the seating configurations depicted in FIGS. 2A, 2B and 2C. A predetermined image orientation may be associated with each of the predetermined seating configurations and the second step 304 may comprise selecting the predetermined image orientation associated with the current configuration of the seating system 4.

As mentioned above, the seats 6 may be pivotally coupled to the guide rail assembly 8, or the seat body 210 of the seat may be pivotally coupled to the seat pillar 220, such that the orientation of the seat or seat body can be adjusted relative to the guide track assembly 8. In some arrangements, seat position sensors 108 may be configured to determine the orientation of the seats and the controller 106 may consider the orientation of the seats when determining the orientation of the first portion of the image I. In particular, the controller 160 may not consider seats that are oriented away from the display surface 102 when determining the orientation of the first portion of the image I to be displayed. In this way, the first portion of the image I may not be oriented towards occupants who are not trying to view the image I.

In a third step 306, the image I is displayed such that the first portion of the image is in the determined orientation, e.g., by projecting the image I using the projector 104 onto the display surface 102.

Figure 2D:
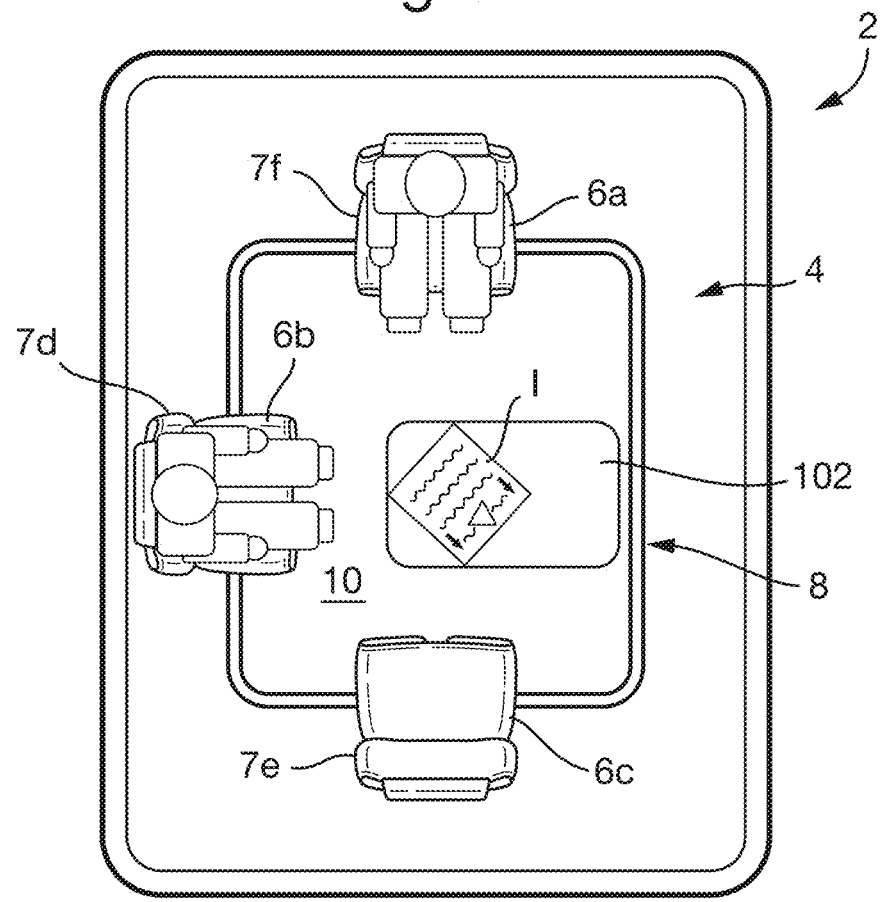
FIG. 2D is a schematic view of a seating arrangement of occupants within the motor vehicle the third seating configuration.

The method 300 may further comprise an occupancy determination step, in which it is determined whether each of the seats is occupied. The orientation of the first portion of the image I displayed by the display system 100 may be determined at least partially according to the occupancy of the seats of the vehicles. For example, as depicted in FIG. 2D, if a particular seat is unoccupied, such as the third seat 6c, the position and orientation of the unoccupied seat may not be considered when determining the orientation of the first portion of the image I to be displayed by the display system 100. In other words, the orientation of the first portion of the image I may be determined by considering the positions and/or orientations of occupied seats only.

With reference again to FIG. 1, each of the seats 200 may comprise a pressure sensor 201 configured to determine whether an occupant is sitting in the seat 200, and to provide an occupancy signal to the controller 106 indicating whether the seat is occupied. The occupancy signal may indicate a pressure measurement by the pressure sensor 201 and the controller 106 may be configured to determine whether the seat is occupied based on the pressure measurement. Alternatively, the seating system 4 or display system 100 may comprise another sensor, such as a camera, capable of determining an occupancy of a seat or seats.

The display system 100 may be configured to determine the orientation of the first portion of the image I displayed by the display system 100 at least partially according to an operating mode of the vehicle 2. For example, if the vehicle is operating in a manual or semi-autonomous driving mode requiring input from the driver during operation of the vehicle. It may be desirable to orientate the image I displayed by the display system 100 away from the driver so as to limit distractions to the driver. Additionally, as the driver is occupied with operating the vehicle, it may not be beneficial to orient the image I towards the driver. In this case better viewing angles may be achieved for the other occupants of the vehicle by not considering the driver's seat, e.g., a seat in or close to the driving position 7a, when determining an orientation of the first portion of the image I to be displayed.

When the vehicle is operating in an autonomous driving mode, e.g., not requiring input from the driver, the position and/or orientation of the driver's seat may be considered in the same way as the other seats when determining the orientation of the first portion of the image I to be displayed by the display system 100.

In some arrangements, the image I may comprise one or more additional portions, the orientations of which may additionally or alternatively be determined according to other factors, as described below.

The controller 106 may be configured to determine an orientation of the vehicle, e.g., a compass direction in which the vehicle is pointing. For example, the vehicle may comprise a compass, such as an electronic compass, or a navigation system configured to provide a signal to the controller 106 indicating the orientation of the vehicle. The orientation of the vehicle may be determined in a further step of the method 300. The display system 100 may be configured such that the orientation of a second portion of the image I is determined according to the orientation of the vehicle 2. The orientation of the second portion of the image I may therefore vary relative to the vehicle and/or the first portion of the image as the orientation of the vehicle changes.

The display system may be further configured such that the orientation of a third portion of the image I remains stationary relative to the vehicle as the orientation of the vehicle changes and regardless of the positions and orientations of the seats and their occupancy. Hence, the orientation of the second portion of the image I may change relative to the third portion of the image I, as the orientation of the vehicle changes.

The orientations of the second and third portions of the image I may be independent of the orientation of the first portion of the image, e.g., independent of the positions and/or orientations of the vehicle seats. However, in some arrangements, the orientations of the second and third portion of the image may be at least partially determined according to the positions and/or orientations of the vehicle seats.

In one arrangement of the present disclosure, the image I displayed by the display system 100 comprises a map and a vehicle position indicator indicating the position and orientation of the vehicle on the map. The second portion of the image may comprise the map. As the vehicle turns, e.g., changes its orientation, the display system 100 may adjust the orientation of the map relative to the vehicle, e.g., such that a northerly direction of the map remains aligned with a north compass direction. The third portion of the image I may comprise the vehicle position indicator. Hence, the orientation of the vehicle position indicator in the image I may remain stationary relative to the vehicle, such that the orientation of the vehicle position indicator relative to the map in the image I is representative of the direction in which the vehicle is pointing.

In such arrangements, the first portion of the image I may contain written information or images relating to a location on the map that forms the second portion of the image. It may therefore be desirable for the orientation of the first portion of the image I to be determined according to the positions and/or orientations of the seats to improve the visibility of the first portion of the image to each of the occupants of the vehicle.

In another arrangement of the disclosure, the first portion of the image I may comprise the map and the second portion of the image may comprise the vehicle position indicator. In this case, the orientation of the second portion may be dependent on the orientation of the vehicle, e.g., the compass direction in which it is pointing, and the orientation of the map, e.g., of the first portion of the image. In this arrangement, the map may remain stationary relative to the occupants as the orientation of the vehicle changes, whilst the vehicle position indicator may move and rotate, e.g., relative to the occupants, as the vehicle moves and turns.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of operating a display system of a vehicle having one or more seats that are variable in a seating configuration, the method comprising:
   determining a seating configuration including position and orientation of the one or more seats that move on a track assembly that extends at least partially around an interior space of the vehicle and extends around a display surface of the display system;
   determining an orientation of at least a first portion of an image to be displayed by the display system according to the seating configuration;
   displaying the image on the display surface such that the at least the first portion of the image is in the determined orientation; and
   determining an operating mode of the vehicle, wherein the orientation of at least the first portion of the image is at least partially determined according to the operating mode of the vehicle, wherein if the operating mode is a manual or semi-autonomous driving mode, the orientation of the at least the first portion of the image is determined such that the at least the first portion of the image is oriented away from a driver of the vehicle.

2. The method of claim 1, wherein the method further comprises:
   determining an occupancy of the one or more seats, wherein the orientation of the at least the first portion of the image is at least partially determined according to the occupancy of the one or more seats.

3. The method of claim 1, wherein the method further comprises:
   determining an orientation of the motor vehicle, wherein the orientation of the first portion and/or a second portion of the image relative to the vehicle is determined according to the orientation of the vehicle, and wherein the image further comprises a third portion, wherein an orientation of the third portion of the image remains stationary relative to the vehicle as the orientation of the vehicle changes.

4. The method of claim 1, wherein the orientation of the at least the first portion of the image to be displayed by the display system is selected from a set of predetermined orientations.

5. The method of claim 1, wherein the orientation of the at least the first portion of the image to be displayed by the display screen is calculated according to the position and orientation of each of the seats.

6. A display system for a vehicle having one or more seats that are variable in position and orientation on a track assembly that extends at least partially around an interior space of the vehicle and extends around a display surface of the display system, comprising:
   a display device configured to display an image; and
   a controller configured to:
      receive a signal indicating position and orientation of the one or more seats;
      determine an orientation of at least a first portion of the image to be displayed by the display device according to the position and orientation of the one or more seats;
      display the image with the display device, such that at least the first portion of the image is in the determined orientation; and
      determine an orientation of the motor vehicle, wherein the orientation of the first portion and/or a second portion of the image relative to the vehicle is determined according to the orientation of the vehicle, and wherein the image further comprises a third portion, wherein an orientation of the third portion of the image remains stationary relative to the vehicle as the orientation of the vehicle changes.

7. The display system of claim 6, wherein the controller is further configured to determine an operating mode of the vehicle, wherein the orientation of at least the first portion of the image is at least partially determined according to the operating mode of the vehicle.

8. The display system of claim 7, wherein if the operating mode is a manual or semi-autonomous driving mode, the orientation of at least the first portion of the image is determined such that at least the first portion of the image is oriented away from a driver of the vehicle.

9. The display system of claim 6, wherein the system further comprises one or more seat sensors configured to determine the position and orientation of the seats and provide the signal to the controller.

10. The display system of claim 6, wherein the controller is further configured to receive an occupancy signal indicating the occupancy of the seats, wherein the orientation of at least the first portion of the image to be displayed by the display system is determined according to the occupancy of the one or more seats.

11. The system of claim 10, wherein the system further comprises one or more seat occupancy sensors configured to determine whether the one or more seats are occupied and provide the occupancy signal to the controller.

12. The system of claim 6, wherein the display system is configured such that the image is displayed on a surface of a table within the interior of the motor vehicle, and wherein the table comprises a touch sensitive element configured to permit an occupant of the vehicle to interact with the image.

13. The system of claim 6, wherein the system further comprises a memory associated with the controller and configured to store one or more predetermined image orientations associated with one or more predetermined seating configurations of the one or more seats.

14. A display system for a vehicle having a variable seating configuration comprising:
   a display device; and
   a controller configured to:
      receive a signal indicating the seating configuration including position and orientation of the one or more seats that move on a track assembly that extends at least partially around an interior space of the vehicle and extends around a display surface of the display system;
      determine an orientation of an image to be displayed by the display device according to the seating configuration;
      display the image with the display device, such that the image is in the determined orientation; and
      determine an operating mode of the vehicle, wherein the orientation of the image is at least partially determined according to the operating mode of the vehicle, wherein if the operating mode is a manual or semi-autonomous driving mode, the orientation of the image is determined such that the image is oriented away from a driver of the vehicle.

* * * * *